United States Patent
Leen et al.

(10) Patent No.: US 6,453,671 B1
(45) Date of Patent: Sep. 24, 2002

(54) COMBUSTOR SWIRLER ASSEMBLY

(75) Inventors: Thomas A. Leen, Cincinnati, OH (US); Robert B. Walmsley, Moscow, OH (US); Hubert S. Robert, Jr., Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/482,668

(22) Filed: Jan. 13, 2000

(51) Int. Cl.[7] ................................................. F02C 1/00
(52) U.S. Cl. ..................... 60/748; 239/533.12; 239/339; 239/408; 60/740
(58) Field of Search ...................... 60/748, 740, 39.31, 60/39.33; 239/533.12, 339, 408, 461, 490, 494, 495, 496, 399, 402, 402.5, 405

(56) References Cited

U.S. PATENT DOCUMENTS

| | | | |
|---|---|---|---|
| 3,589,127 A | * 6/1971 | Kenworthy | ................ 60/39.37 |
| 4,198,815 A | 4/1980 | Bobo et al. | .................... 60/737 |
| 4,584,834 A | 4/1986 | Koshoffer et al. | ............ 60/737 |
| 4,763,482 A | * 8/1988 | Wehner | ........................ 60/746 |
| 5,117,637 A | * 6/1992 | Howell et al. | ................. 60/748 |
| 5,123,248 A | 6/1992 | Monty et al. | .................. 60/740 |
| 5,197,290 A | 3/1993 | Lee et al. | ..................... 60/748 |

* cited by examiner

Primary Examiner—Charles G. Freay
Assistant Examiner—W Rodriguez
(74) Attorney, Agent, or Firm—Rodney M. Young; Pierce Atwood

(57) ABSTRACT

Service life is improved in a swirler assembly including a primary swirler and a secondary swirler having a venturi formed thereon and being disposed in engagement with the primary swirler. First and second rails are formed on the secondary swirler and are positioned to engage the primary swirler and thereby prevent relative rotation of the primary and secondary swirlers.

18 Claims, 3 Drawing Sheets

COMBUSTOR SWIRLER ASSEMBLY

STATEMENT REGARDING FEDERALLY SPONSORED RESEARCH & DEVELOPMENT

The U.S. Government may have certain rights in this invention pursuant to contract number F33657-95-C-0055 and contract number F33657-97-C-0016, both awarded by the Department of the Air Force.

BACKGROUND OF THE INVENTION

This invention relates generally to gas turbine engines and more particularly to swirler assemblies for supplying compressed air to the combustor of such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In combustors used with aircraft engines, the fuel is typically supplied to the combustor through a plurality of fuel nozzles positioned at one end of the combustion zone. The air is supplied through surrounding assemblies, known as swirler assemblies, which impart a swirling motion to the air so as to cause the air and fuel to be thoroughly mixed. The swirler assemblies are mounted in a dome plate that is joined to the upstream ends of the combustor's inner and outer liners, and each fuel nozzle tip is received in a corresponding one of the swirler assemblies.

One conventional swirler assembly is a three part assembly comprising a primary swirler, a secondary swirler and a retainer. The primary swirler has a plurality of circumferentially spaced swirl vanes or air passages. The vanes or passages are angled with respect to the axial centerline of the swirler assembly so as to impart a swirling motion to the air flow. The secondary swirler, also having a plurality of circumferentially spaced swirl vanes or air passages, is disposed immediately downstream of the primary swirler. The vanes or passages of the secondary swirler are angled so as to produce a swirl of air swirling in the opposite direction as the primary swirler to further promote fuel-air mixing. The retainer fits over the primary swirler and is welded to the secondary swirler to retain the two swirlers in engagement with one another.

The air flow through the vanes or passages of the primary swirler creates a reaction force that tends to cause the primary swirler to rotate with respect to the secondary swirler and the fuel nozzle. However, if allowed to rotate, the primary swirler would fail to impart the necessary level of swirling to the air, and effective mixing of the air and fuel would not be achieved. Furthermore, rotation of the primary swirler would cause excessive wear to the fuel nozzle tip. Primary swirler rotation is thus prevented in conventional swirler assemblies by providing an outwardly extending tab on the primary swirler and a post on the secondary swirler, wherein the tab engages the post so as to limit relative rotation of the swirlers.

However, the combustor structure is vibrationally active and there is substantial thermal expansion of components during operation of a gas turbine engine. As a result, there is relative movement between the tab and the post resulting in significant wear that eventually requires repair and increases maintenance costs. The repair process is relatively difficult because it requires removal of the permanently welded retainer. It is also possible that a worn tab and/or post could break off and cause damage to the turbine downstream. Furthermore, the retainer is susceptible to cracking during operation and often needs to be replaced.

Accordingly, there is a need for an improved swirler assembly that prevents rotation between the primary and secondary swirlers without requiring frequent repairs.

BRIEF SUMMARY OF THE INVENTION

The above-mentioned need is met by the present invention, which provides a swirler assembly including a primary swirler and a secondary swirler having a venturi formed thereon and being disposed in engagement with the primary swirler. First and second rails are formed on the secondary swirler and are positioned to engage the primary swirler so as to prevent rotation of the primary swirler relative to the secondary swirler.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
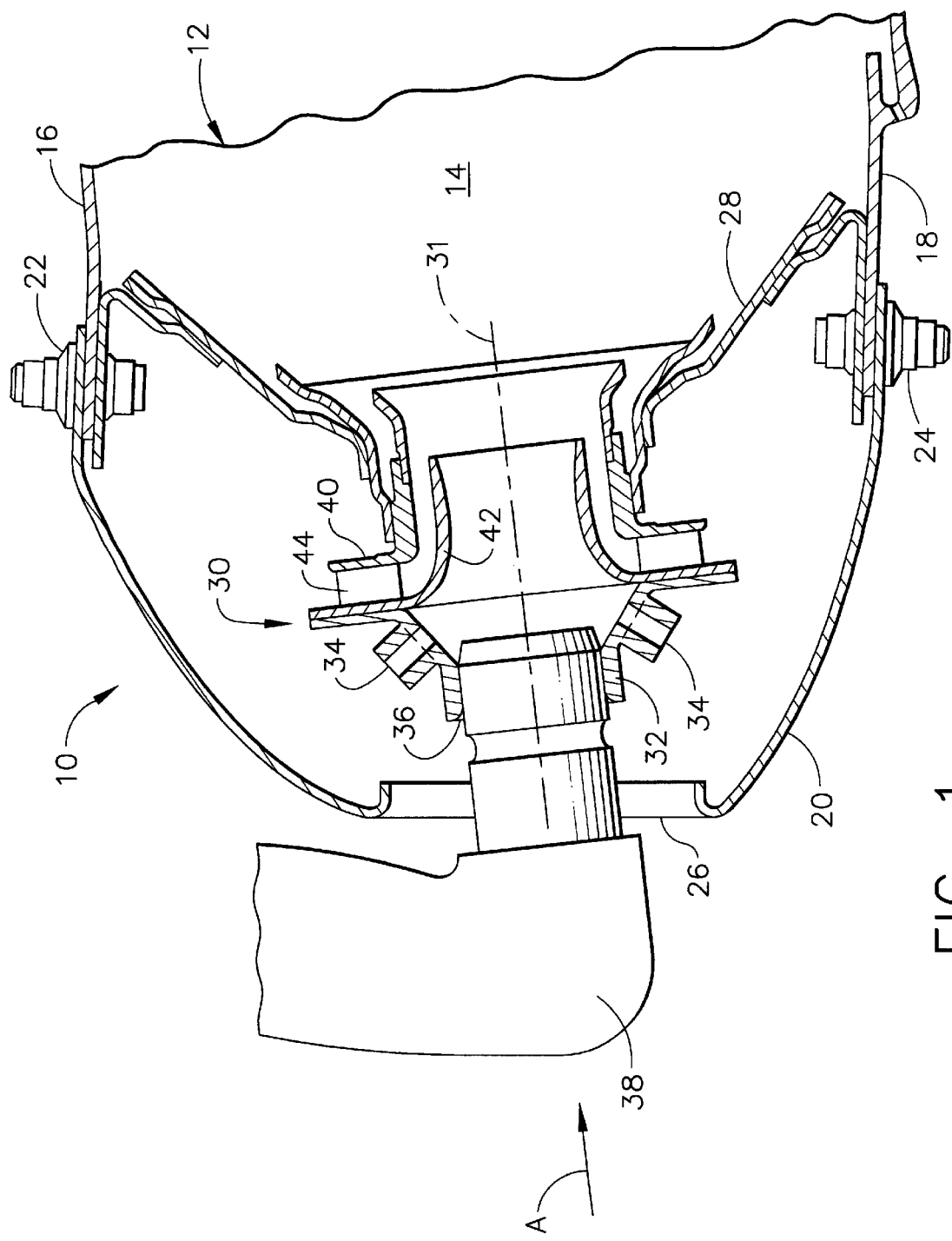
FIG. 1 is an axial sectional view of the forward portion of combustor having a swirler assembly of the present invention.

Referring to the drawings wherein identical reference numerals denote the same elements throughout the various views, FIG. 1 shows the forward end of a combustor 10 of the type suitable for use in a gas turbine engine and including a hollow body 12 defining a combustion chamber 14 therein. The hollow body 12 is generally annular in form and is defined by an outer liner 16 and an inner liner 18. The upstream end of the hollow body 12 is substantially closed off by a cowl 20 attached to the outer liner 16 by a first fastener 22 and to the inner liner 18 by a second fastener 24. At least one opening 26 is formed in the cowl 20 for the introduction of fuel and compressed air. The compressed air is introduced into the e combustor 10 from a compressor (not shown) in a direction generally indicated by arrow A of FIG. 1. The compressed air passes primarily through the opening 26 to support combustion and partially into the e region surrounding the hollow body 12 where it is used to cool both the liners 16, 18 and turbomachinery further downstream.

Disposed between and interconnecting the outer and inner liners 16, 18 near their upstream ends is an annular dome plate 28. A plurality of circumferentially spaced swirler assemblies 30 (one shown in FIG. 1) is mounted in the dome plate 28. Each swirler assembly 30 includes a primary swirler 32 that comprises a plurality of angularly directed passages 34. The passages 34 are angled with respect to the axial centerline 31 of the swirler assembly 30 so as to impart a swirling motion to the air flow. The primary swirler 32 also has a central opening 36 that coaxially receives a fuel nozzle 38.

The swirler assembly 30 further includes a secondary swirler 40 that adjoins the primary swirler 32, downstream thereof, and is fixedly received in the dome plate 28. The secondary swirler 40 includes a venturi 42 and a plurality of circumferentially spaced swirl vanes 44 disposed coaxially about the venturi 42. The venture 42 and the central opening 36 of the primary swirler 32 are both coaxially aligned with the axial centerline 31 of the swirler assembly 30. Air from the opening 26 passes through the passages 34. The swirling air exiting the passages 34 interacts with fuel injected from the fuel nozzle 38 so as to mix as it passes into the venturi 42. The secondary swirl vanes 44 then act to present a swirl of air swirling in the opposite direction that interacts with the fuel/air mixture so as to further atomize the mixture and prepare it for combustion in the combustion chamber 14. It should be noted that although FIG. 1 illustrates the swirler assembly of the present invention in a single annular combustor, the present invention is equally applicable to other types of combustors, including multi-annular combustors.

Figure 2:
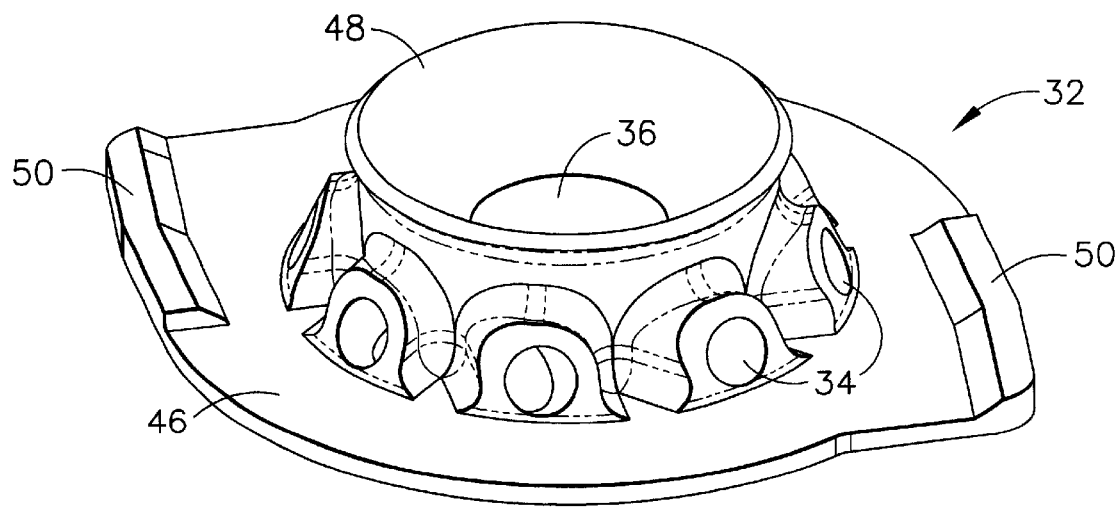
FIG. 2 is a perspective view of a primary swirler for the swirler assembly of the present invention.
Figure 3:
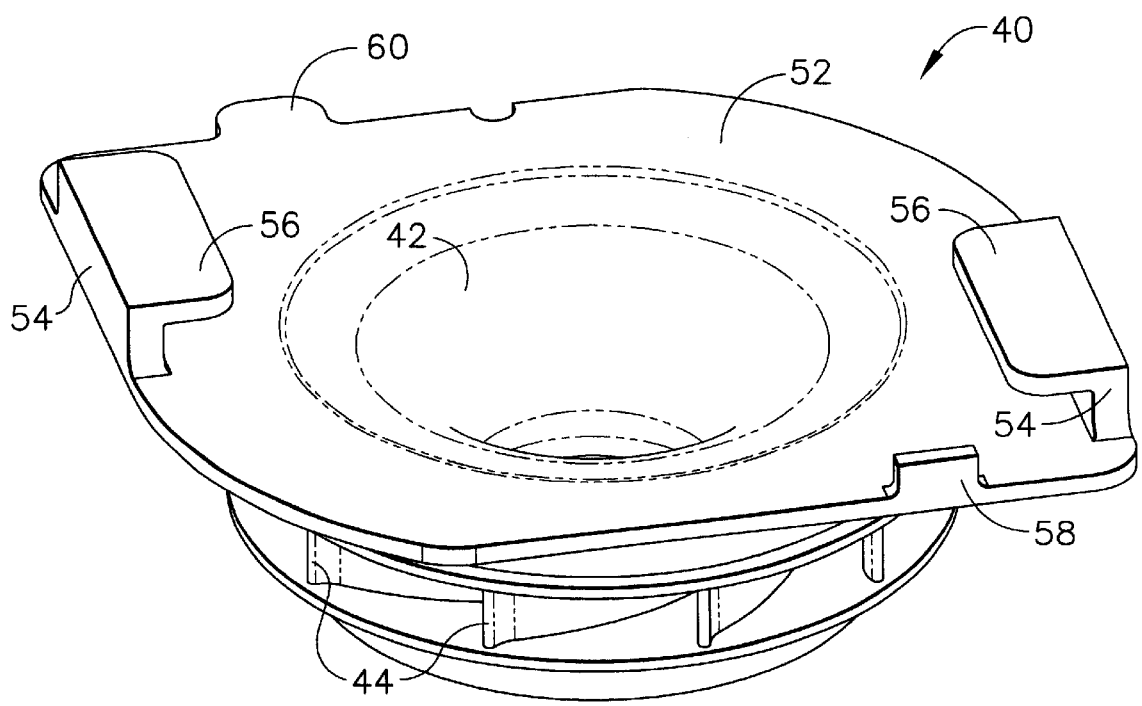
FIG. 3 is a perspective view of a secondary swirler for the swirler assembly of the present invention.
Figure 4:
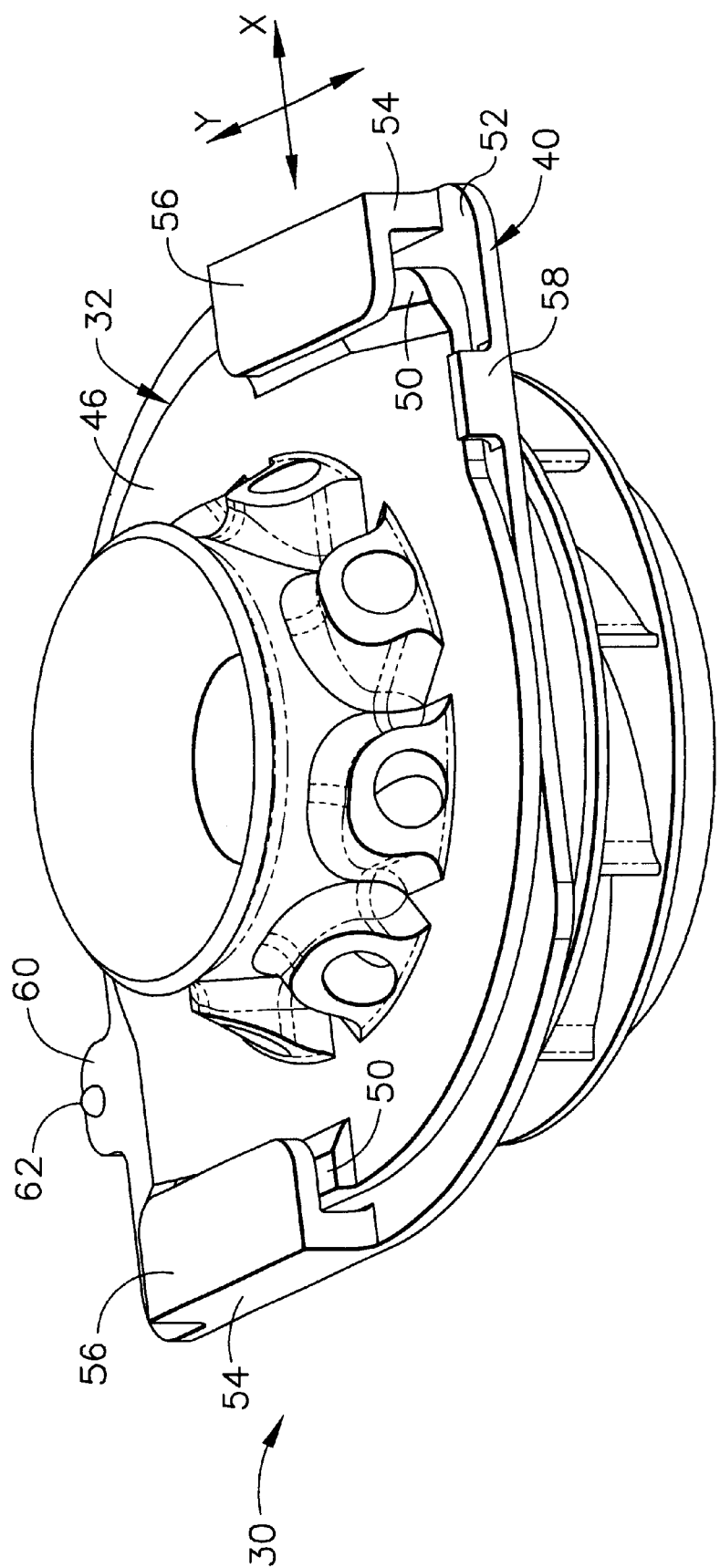
FIG. 4 is a perspective view of an assembled swirler assembly of the present invention.

Turning now to FIGS. 2–4, a swirler assembly 30 is shown in more detail. As seen in FIG. 2, the primary swirler 32 comprises a base section 46 having a ferrule 48 formed on one surface thereof. The base section 46 is a flat member having opposing planar surfaces and defining a perimeter or outer edge. The first surface of the base section 46, from which the ferrule 48 extends, faces upstream when the swirler assembly 30 is properly positioned in the combustor 10. The passages 34 are disposed circumferentially about the ferrule 48, which defines the above-mentioned central opening 36. A pair of raised protrusions 50 are formed on the first surface of the base section 46, along the outer edge thereof and on opposite sides of the ferrule 48 so as to be arranged substantially parallel to one another.

Referring to FIG. 3, the secondary swirler 40 comprises a base section 52, which is also a flat member having opposing planar surfaces and defining a perimeter or outer edge. The base section 52 has a first, upstream-facing surface, which engages the second surface of the primary swirler 32 when the swirler assembly 30 is assembled, and a second, downstream-facing surface. The venturi 42 extends axially (with respect to the axial centerline 31 of the swirler assembly 30) outward from the second surface and, as mentioned above, the swirl vanes 44 are disposed coaxially about the venturi 42. A pair of retainer rails 54 extends axially outward from the first surface of the base section 52. Each retainer rail 54 is located along the outer edge of the base section 52, on opposite sides of the venturi 42 so as to be arranged substantially parallel to one another. Each retainer rail 54 includes a substantially radially (with respect to the axial centerline 31 of the swirler assembly 30) inwardly directed flange 56 thereon for engaging the primary swirler 32.

The secondary swirler 40 further includes a stop tab 58 formed on the outer edge of the base section 52 and extending axially outward from the first surface thereof. The stop tab 58 defines a planar surface and is located on the outer edge of the base section 52 such that its planar surface extends perpendicularly to the retainer rails 54. A weld tab 60 is also formed on the outer edge of the base section 52 but extends substantially radially outwardly therefrom. The weld tab 60 is located on an opposite side of the venturi 42 from the stop tab 58.

The base sections 46 and 52 of the two swirlers 32 and 40 have substantially the same shape, although the base section 52 of the secondary swirler 40 is slightly larger. The protrusions 50 and the retainer rails 54 are located in corresponding positions on the outer edges of the similarly shaped base sections 46 and 52, respectively. Thus, as shown in FIG. 4, the swirler assembly 30 is assembled by sliding the primary swirler 32 into engagement with the secondary swirler 40 such that the base sections 46 and 52 abut one another in a substantially coplanar manner. Furthermore, the protrusions 50 will be aligned with the retainer rails 54 so as to prevent rotation of the primary swirler 32 relative to the secondary swirler 40. The protrusions 50 will also be engaged by the retainer rail flanges 56 so as to axially hold the two swirlers 32 and 40 together. The protrusions 50 provide an enlarged contact area with the retainer rails 54 so as to reduce wear thereof.

The retainer rails 54 also limit lateral movement of the primary swirler 32 with respect to the secondary swirler 40 along a first axis, denoted as axis X in FIG. 4, which lies in the plane defined by the base sections 46 and 52. That is, the two retainer rails 54 are spaced apart sufficiently in the X direction to allow limited lateral movement of the primary swirler 32 relative to the secondary swirler 40. Similarly, the stop tab 58 and a tack weld 62, which is applied to the weld tab 60 after assembly of the two swirlers 32 and 40, operate to limit lateral movement of the primary swirler 32 along a second axis, denoted as axis Y in FIG. 4, which also lies in the plane defined by the base sections 46 and 52, perpendicular to axis X. In this case, the stop tab 58 and the tack weld 62 are spaced apart sufficiently in the Y direction to permit limited lateral movement of the primary swirler 32 relative to the secondary swirler 40. This arrangement allows the primary swirler 32 to float or move laterally so that the ferrule 48 can be coaxially aligned with, and receive, the fuel nozzle 38, but otherwise prevents the two swirlers 32 and 40 from becoming disengaged while the swirler assembly 30 is being installed in the engine 10.

Once the swirler assembly 30 is installed in the engine 10, the fuel nozzle 38 centers and holds the primary swirler 32 in place between the two retainer rails 54. Thus, the retainer rail flanges 56, the stop tab 58 and the tack weld 62 provide no further function when the swirler assembly 30 is installed in the engine 10. Furthermore, air flow from the compressor during engine operation holds the primary swirler 32 against the secondary swirler 40. At the same time, air flowing through the passages 34 of the primary swirler 32 creates a reaction force that causes the primary swirler 32 to rotate slightly such that the protrusions 50 engage the retainer rails 54. The retainer rails 54 are located in relation to the axial centerline 31 of the swirler assembly 30 and the angle of the passages 34 so to oppose first swirler rotation. Engagement of the retainer rails 54 by the protrusions 50 thereby prevents rotation of the primary swirler 32 with respect to the secondary swirler 40, and thus with respect to the fuel nozzle 38 as well.

The foregoing has described a swirler assembly 30 that prevents primary swirler rotation and retains both swirlers 32 and 40 in engagement. The present invention accomplishes this with two parts rather than the three parts used in conventional swirler assemblies. A two part assembly reduces costs and facilitates manufacture since the fixturing and set-up for welding a separate retainer is eliminated. Repair of the swirler assembly is easier because removing the primary swirler 32 during field repair simply requires removal of the small tack weld 62 rather than removing, a permanently welded retainer as before. Furthermore, the contact area between the protrusions 50 and the retainer rails 54 in the present invention is greater than the contact area of a conventional post-tab arrangement. This greater contact area decreases wear, thereby extending the life of the parts and decreasing the frequency of repairs.

While specific embodiments of the present invention have been described, it will be apparent to those skilled in the art that various modifications thereto can be made without departing from the spirit and scope of the invention as defined in the appended claims.

What is claimed is:

1. A swirler assembly comprising:
   a first swirler; and
   a second swirler in engagement with said first swirler having at least one rail formed thereon, wherein said at least one rail engages an edge of said first swirler so as to prevent relative rotation of said first and second swirlers.

2. The swirler assembly of claim 1 further comprising a stop tab formed on said second swirler.

3. The swirler assembly of claim 2 wherein said stop tab is formed on an outer edge of said second swirler.

4. The swirler assembly of claim 3 wherein said stop tab defines a planar surface that is perpendicular to said rail.

5. The swirler assembly of claim 3 further comprising a tack weld applied to said second swirler, said tack weld being spaced from said stop tab so as to permit limited lateral movement of said first swirler relative to said second swirler.

6. The swirler assembly of claim 5 further comprising a weld tab formed on said second swirler, wherein said tack weld is applied to said weld tab.

7. The swirler assembly of claim 1 further comprising a second rail formed on said second swirler, wherein said second rail engages an edge of said first swirler and is spaced from said at least one rail so as to permit limited lateral movement of said first swirler relative to said second swirler.

8. The swirler assembly of claim 7 wherein said second rail and said at least one rail are parallel to one another.

9. The swirler assembly of claim 1 wherein said at least one rail has an inwardly directed flange for med thereon so as to retain said first swirler and said second swirler in engagement.

10. The swirler assembly of claim 1 further comprising a protrusion formed on said first swirler, wherein said at least one rail engages said first swirler at said protrusion.

11. A swirler assembly comprising:
    a primary swirler including a base section defining an outer edge and having a central opening formed therein;
    a secondary swirler including a base section defining an outer edge and having a venturi formed thereon, said secondary swirler being disposed in engagement with said primary swirler;
    first and second rails formed on said secondary swirler, said first and second rails each engaging said outer edge of said primary swirler so as to prevent relative rotation of said primary and secondary swirlers.

12. The swirler assembly of claim 11 further comprising:
    a stop tab formed on said outer edge of said secondary swirler, said stop tab being located so as to engage said outer edge of said primary swirler; and
    a weld tab formed on said secondary swirler and a tack weld applied to said weld tab, said tack weld being spaced from said stop tab so as to permit limited lateral movement of said primary swirler relative to said secondary swirler.

13. The swirler assembly of claim 11 wherein said first and second rails are formed on said outer edge of said secondary swirler, on opposite sides of said venturi.

14. The swirler assembly of claim 13 wherein said first and second rails are spaced apart so as to permit limited lateral movement of said primary swirler relative to said secondary swirler.

15. The swirler assembly of claim 14 wherein said first and second rails are parallel to one another.

16. The swirler assembly of claim 12 wherein said stop tab defines a planar surface that contacts said outer edge of said primary swirler and is perpendicular to said first and second rails.

17. The swirler of claim 11 wherein each of said first and second rails has an inwardly direct flange formed thereon so as to retain said primary and secondary swirlers in engagement.

18. The swirler assembly of claim 11 further comprising first and second protrusions formed on said primary swirler, wherein said first and second rails engage said primary swirler at said first and second protrusions, respectively.

* * * * *